(12) United States Patent
Miura et al.

(10) Patent No.: US 8,786,919 B2
(45) Date of Patent: Jul. 22, 2014

(54) IMAGE SCANNING APPARATUS (71) Applicants: Katsuro Miura, Toyota (JP); Yoshinori Osakabe, Seto (JP); Muneaki Takahata, Toyoake (JP)

(72) Inventors: Katsuro Miura, Toyota (JP); Yoshinori Osakabe, Seto (JP); Muneaki Takahata, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/629,674

(22) Filed: Sep. 28, 2012

(65) Prior Publication Data
US 2013/0107334 A1    May 2, 2013

(30) Foreign Application Priority Data
Oct. 31, 2011   (JP) ................................. 2011-239086

(51) Int. Cl.
H04N 1/04   (2006.01)
H04N 1/46   (2006.01)

(52) U.S. Cl.
USPC ........... 358/498; 358/474; 358/486; 358/494; 358/505

(58) Field of Classification Search
USPC ............ 358/498, 1.13, 1.15, 1.14, 1.16, 1.17, 358/1.18, 1.9, 474, 496, 486, 494, 408, 514, 358/515, 512, 505, 448, 468; 271/3.24, 271/12.1, 160, 10.03, 9.02, 3.12, 124, 4.08, 271/303, 186, 121, 242, 274, 256.01, 3.15, 271/65; 399/119, 124, 401, 405, 364, 374, 399/369, 376, 211, 8, 367, 31, 406
See application file for complete search history.

(56) References Cited

U.S. PATENT DOCUMENTS

| 4,979,727 | A  | * | 12/1990 | Koike et al. ................... 271/3.03 |
| 7,588,246 | B2 | * |  9/2009 | Kawamura ..................... 271/124 |
| 8,059,314 | B2 | * | 11/2011 | Ishido ........................... 358/474 |
| 8,102,578 | B2 | * |  1/2012 | Oh ................................ 358/498 |
| 2003/0063332 | A1 | * |  4/2003 | Sato ............................. 358/474 |
| 2005/0184455 | A1 | * |  8/2005 | Youn ............................ 271/274 |
| 2006/0193666 | A1 | * |  8/2006 | Tomatsu ....................... 399/401 |
| 2007/0063422 | A1 | * |  3/2007 | Kuo et al. ..................... 271/121 |

FOREIGN PATENT DOCUMENTS

JP   2010-064844   3/2010

* cited by examiner

*Primary Examiner* — Ngon Nguyen
(74) *Attorney, Agent, or Firm* — Banner & Witcoff, Ltd.

(57) ABSTRACT

An image scanning apparatus comprising a feeding unit and a scanning unit is provided. The feeding unit comprises a separation unit configured to separate the document sheet and a discharge unit configured to discharge the document sheet to a discharge tray. The feeding path includes a curved path formed to change the feeding direction with respect to the image scanning apparatus, and a length of the feeding path from a downstream side end of the scanning unit in the feeding direction to a position of the discharge unit is shorter than a length of the feeding path from a position of the separation unit to the downstream side end of the scanning unit.

13 Claims, 6 Drawing Sheets

IMAGE SCANNING APPARATUS

CROSS-REFERENCE TO RELATED APPLICATION

This application claims priority under 35 U.S.C. §119 from Japanese Patent Application No. 2011-239086 filed on Oct. 31, 2011. The entire subject matter of the application is incorporated herein by reference.

BACKGROUND

1. Technical Field

The following description relates to an image scanning apparatus configured to scan an image of a document sheet while feeding the document sheet along a feeding path that is defined between a document tray with a discharge tray, and includes a curved path.

2. Related Art

Conventionally, an image scanning apparatus including an ADF unit (i.e., Auto Document Feeder) is known. Such an image scanning apparatus is configured such that document sheets loaded on a document tray are sequentially fed by the ADF unit along a predetermined feeding path, and images of the document sheets fed by the ADF unit are scanned by a scanning unit. Then, the document sheet of which image has been scanned by the scanning unit is fed along the feeding path and discharged to a discharge tray.

An image scanning apparatus having a document cover which is disposed so as to be openable and closable with respect to an upper face of a main body of the apparatus is also known. The image scanning apparatus is configured to scan an image of a first face of a document sheet while feeding the document sheet along a predetermined feeding path by the ADF unit disposed on the document cover.

SUMMARY

In the above described image scanning apparatus, the document tray and the discharge tray are respectively disposed on a different height of the apparatus. In order to connect the document tray with the discharge tray, the feeding path includes a U-shaped curved path so that the document sheet is fed while changing its feeding direction. Further, in the above described image scanning apparatus, an image on the first face of the document sheet that is fed along the feeding path is scanned with an image sensor. The image sensor is disposed along the feeding path at an upstream side relative to the curved path in the feeding direction.

Incidentally, it is desirable to provide an image scanning apparatus having a both side scanning function, which is a function to scan an image on the first face of the document sheet and an image on a second face that is a reverse side of the first face while continuously feeding the document sheet.

In order to achieve the both side scanning by feeding the document sheet once, a second image sensor for scanning an image on the second face of the document sheet has to be disposed along the feeding path, in addition to the first image sensor for scanning an image on the first face of the document sheet. Since the second image sensor has to be disposed along the feeding path and on a position different from the position of the first image sensor, the length of the feeding path tends to be elongated. Further, when the both side scanning is performed, the document sheet has to be fed between the document tray and the discharge tray along the feeding path by the ADF unit. Thus, there is a problem that a required time for performing the both side scanning becomes longer as the length of the feeding path becomes longer.

Additionally, it is desired to downsize the image scanning apparatus including the ADF unit. In this regard, when the second image sensor is disposed in addition to the first image sensor for the both side scanning, the size of the image scanning apparatus might become large depending on a placement of the first image sensor and the second image sensor.

In view of the above deficiencies, aspects of the present invention provide an image scanning apparatus configured to scan an image of a document sheet while feeding the document sheet along a feeding path including a curved path, and that achieves downsizing of the apparatus and shortening the required time for the both side scanning.

Specifically, there is provided an image scanning apparatus comprising a feeding unit configured to feed at least one document sheet in a feeding direction along a feeding path and a scanning unit configured to scan an image of the document sheet fed by the feeding unit along the feeding path. The feeding unit comprises a separation unit configured to separate the document sheet from other sheets on a sheet-by-sheet basis and convey the separated sheet to the scanning unit and a discharge unit configured to discharge the document sheet to a discharge tray, the discharge unit being disposed on an upstream side relative to the discharge tray and on a downstream side relative to the scanning unit in the feeding direction. Additionally, the feeding path includes a curved path formed to change the feeding direction with respect to the image scanning apparatus, and a length of the feeding path from a downstream side end of the scanning unit in the feeding direction to a position of the discharge unit is shorter than a length of the feeding path from a position of the separation unit to the downstream side end of the scanning unit.

DETAILED DESCRIPTION

It is noted that various connections are set forth between elements in the following description. It is noted that these connections in general and, unless specified otherwise, may be direct or indirect and that this specification is not intended to be limiting in this respect.

Hereinafter, an image scanning apparatus 1, which includes an automatic document feeder (ADF) unit 10, in an embodiment according to aspects of the present invention will be described with reference to the accompanying drawings.

Firstly, a general configuration of the image scanning apparatus 1 is described in detail with reference to FIG. 1. The following description refers to an up and down direction (the vertical direction), a front and rear direction, and a left and right direction (the horizontal direction) defined as shown in the accompanying drawings.

Figure 1:
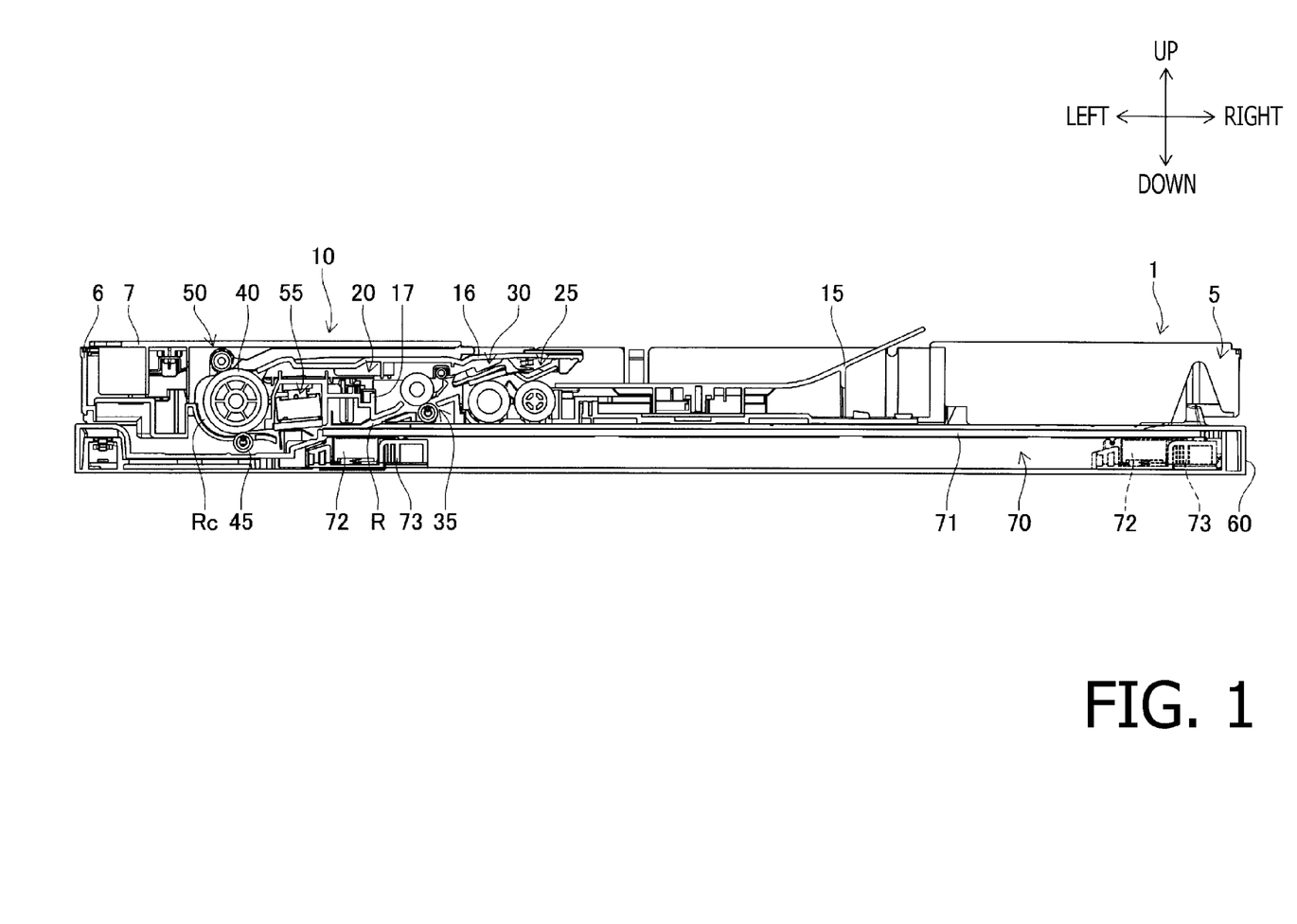
FIG. 1 is a cross-sectional view showing configurations of an image scanning apparatus according to an aspect of the present invention.
Figure 5:
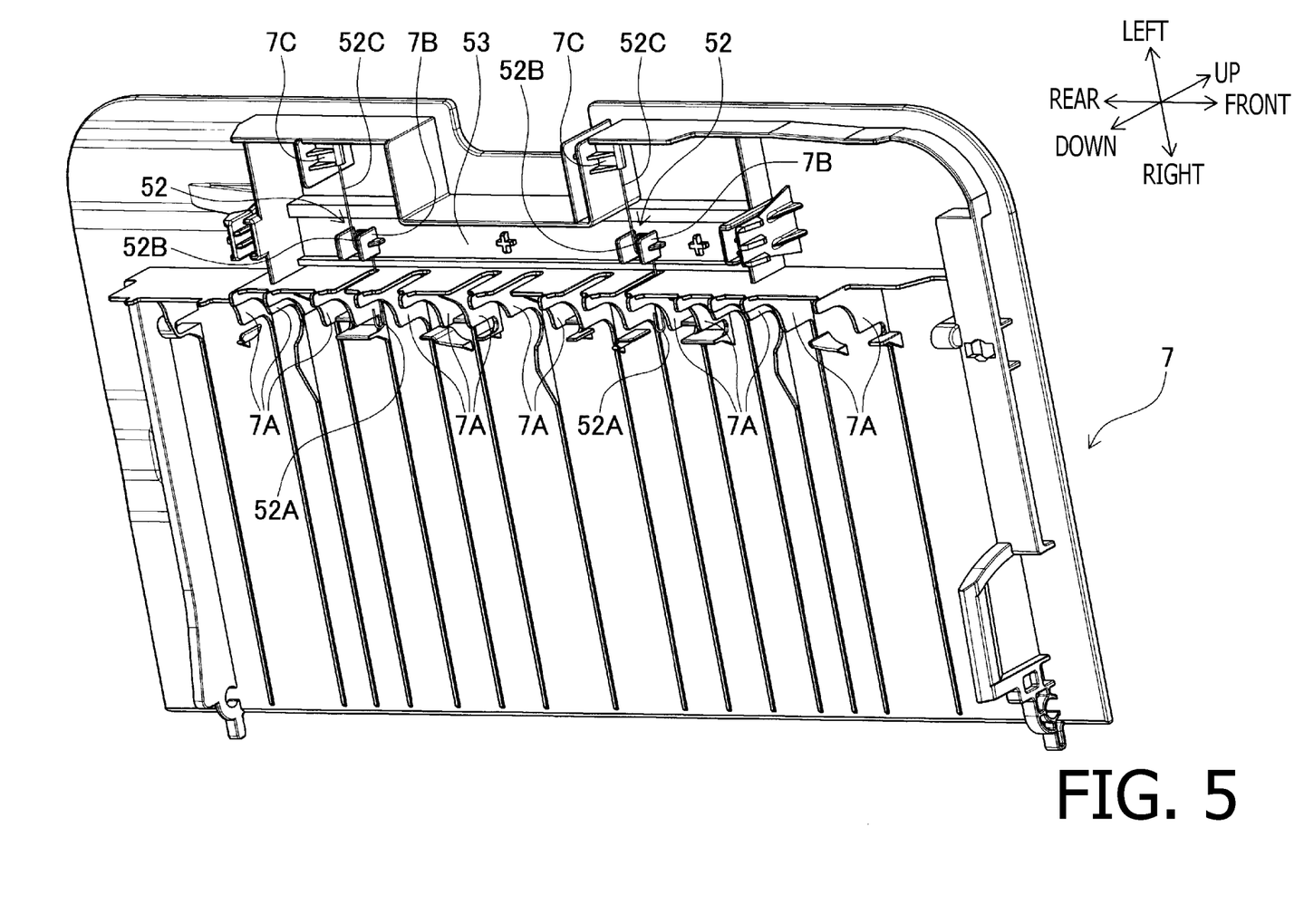
FIG. 5 is a perspective view showing a configuration of an upper cover.

As shown in FIG. 1, the image scanning apparatus 1 includes a document cover 5 and a main housing 60. The document cover 5 is formed with a cover housing 6 and an upper cover 7. The document cover 5 is disposed to turn around a rear end of an upper face of the main housing 60 in a manner openable and closeable relative to the main housing 60. The document cover 5 includes the ADF unit 10 disposed on a left portion thereof. The upper cover 7 forms an upper face of the ADF unit 10 (i.e., the upper left side part of the document cover 5). The upper cover 7 is disposed in a manner openable and closeable relative to the main housing 60. As shown in FIG. 5, the upper cover 7 is provided with a second guide rib 7A, a second spring attaching part 7B and a second fixed end portion supporting part 7C. A configuration of the upper cover 7 will be described in detail later with reference to the relevant drawings.

The ADF unit 10 is configured to feed a document sheet loaded on a document tray 15 along a predetermined document feeding path R to scan an image of the document sheet, and discharge to a discharge tray 16. The ADF unit 10 includes a sheet feeding unit 25, a separation unit 30, feeding rollers 35, a main roller 40, a nip roller 45, a discharge unit 50, and an image scanning unit 55. A configuration of the ADF unit 10 will be described in detail later with reference to the relevant drawings.

The main housing 60 is configured to accommodate various kinds of components for achieving a scanning function of the image scanning apparatus 1. Specifically, the main housing 60 accommodates a controller for controlling the image scanning apparatus 1. The controller includes a CPU, a ROM, and a RAM to control the various functions of the image scanning apparatus 1. Thus, the controller achieves the scanning function by controlling the components such as the ADF unit 10, and a scanning unit 70 described later.

The main housing 60 accommodates the scanning unit 70 therein. The scanning unit 70 is configured to scan an image of the document sheet, and serve as a flat bed scanner. Specifically, the scanning unit 70 includes a contact glass 71 on which the document sheet is placed, a scanning sensor 72, a carriage 73, a slide shaft, motor, etc. (see FIG. 2). The contact glass 71 is a so-called "platen glass" formed in a rectangular shape of which long side (i.e., a longitudinal direction) is disposed to be along the left and right direction of the main housing 60. The contact glass 71 is slightly larger than A4 size.

The scanning sensor 72 is a Contact Image Sensor (CIS) configured to scan an image of the document sheet on the contact glass 71 while moving in the left and right direction. The scanning sensor 72 has a scanning area of which length in a main scanning direction (i.e., the front and rear direction of the main housing 60) corresponds to a length of a short side of A4 size. The scanning sensor 72 is disposed on the carriage 73 that is movable in the left and right direction.

The carriage 73 is supported by the slide shaft extending in the left and right direction of the main housing 60 so that the carriage 73 is slidable within a predetermined area in the left and right direction (i.e., an area corresponds to the long side of A4 size). Thus, in the image scanning apparatus 1, an image of the document sheet on the contact glass 71 can be scanned while sliding the carriage 73 that includes the scanning sensor 72 along the slide shaft, based on the drive control of the motor by the controller.

It is noted that, in the image scanning apparatus 1 in the embodiment, when a both side scanning is performed by the ADF unit 10, the scanning sensor 72 and the carriage 73 are disposed on the leftmost side of the slide shaft (i.e., a position where the scanning sensor 72 and the carriage 73 are indicated in solid line in FIG. 1). Hereinafter, such a position of the scanning sensor 72 and the carriage 73 is referred to as "an ADF scanning position." On the other hand, when the scanning unit 70 is used as the flat bed scanner, the scanning sensor 72 and the carriage 73 are disposed on the rightmost side of the slide shaft (i.e., a position where the scanning sensor 72 and the carriage 73 are indicated in broken line in FIG. 1).

As described above, the document cover 5 is disposed to turn around the rear end of the upper face of the main housing 60 in a manner openable and closeable relative to the main housing 60, and, as shown in FIG. 1, the document cover 5 covers the upper face of the main housing 60 (i.e., an upper face of the scanning unit 70) when it is closed. Thus, when the document cover 5 is closed, a position of the document sheet to be scanned by the scanning unit 70 is fixed, by the document cover 5, to a position as it is placed.

Subsequently, a detailed explanation will be provided about a configuration of the ADF unit 10 of the image scanning apparatus 1 with reference to the relevant drawings. As shown in FIG. 1, the ADF unit 10 mainly includes the document tray 15, the discharge tray 16, feeding path defining member 17, a feeding mechanism 20, a driving motor (not shown), and the image scanning unit 55. In the ADF unit 10, the document feeding path R is formed by the feeding path defining member 17 and the feeding mechanism 20. The ADF unit 10 is configured to scan an image of the document sheet with the image scanning unit 55 while feeding the document sheet on the document tray 15 along the document feeding path R, and discharge the document sheet to the discharge tray 16. The driving motor is a driving source for feeding the document sheet by the ADF unit 10 and drives the feeding mechanism 20 under the control of the controller.

The document tray 15 is disposed on a center of the document cover 5 in the left and right direction. The document sheet to be fed by the ADF unit 10 is placed on the document tray 15 so that the long side of the sheet is along the left and right direction of the image scanning apparatus 1 (i.e., in a state where the short side of the document sheet is parallel to the front and rear direction of the image scanning apparatus 1). The document tray 15 is formed to be along one end of the document feeding path R at a lower side of the ADF unit 10.

Figure 2:
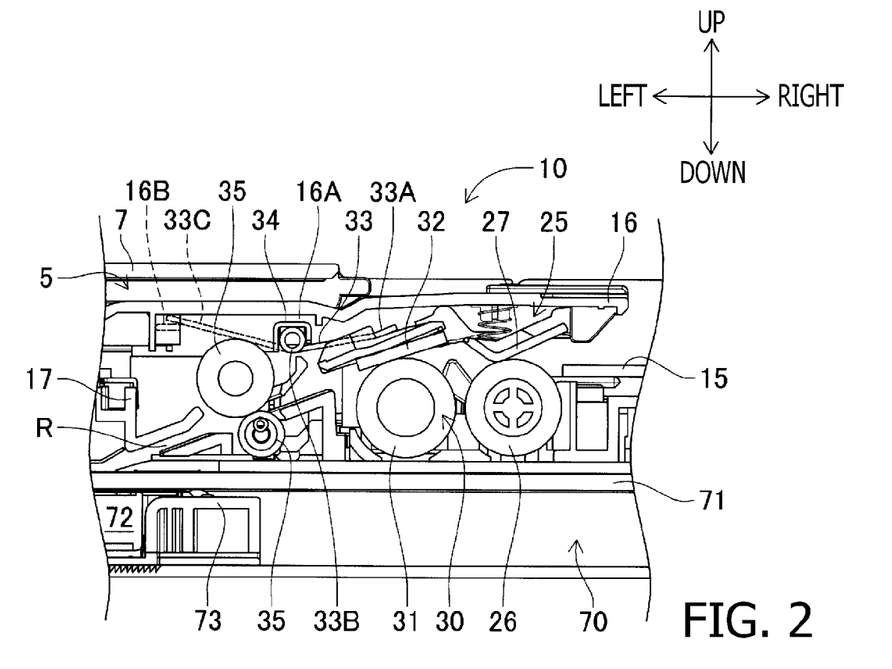
FIG. 2 is an enlarged cross-sectional view showing configurations of a sheet feeding unit and a separation unit.

The discharge tray 16 is disposed on an upper side of the document tray 15 with a predetermined distance from the document tray 15. The discharge tray 16 is formed along another end of the document feeding path R at an upper side of the ADF unit 10. The discharge tray 16 is disposed on a left side relative to the document tray 15 in the left and right direction of the image scanning apparatus 1. The discharge tray 16 has an upper face on which the document sheets fed by the ADF unit 10 are stacked. As shown in FIG. 2, the discharge tray 16 is provided with a first spring attaching part 16A and a first fixed end portion supporting part 16B on its lower face. The first spring attaching part 16A and the first fixed end portion supporting part 16B are used to attach a first torsion spring 33 of the separation unit 30. A configuration of those components will be described later in detail.

The feeding path defining member 17 is disposed on the left side of the document tray 15 and a lower side of the discharge tray 16. A lower face of the feeding path defining member 17 forms a part of the document feeding path R that extends below the ADF unit 10 in the left-to right direction. The feeding path defining member 17 is provided with a first guide rib 17A and a sensor housing 58 that includes the image scanning unit 55 on its lower face which forms the part of the document feeding path R. Additionally, a main roller supporting part 17B is provided on a left side of the lower face of the feeding path defining member 17 (see FIG. 6). A configuration of the feeding path defining member 17 will be described in detail later with reference to the relevant drawings.

The document feeding path R is formed, in the ADF unit 10, to extend from the document tray 15 along the lower face of the feeding path defining member 17 in the left and right direction of the image scanning apparatus 1, and to connect with the surface of the discharge tray 16. Further, the document feeding path R has a curved path Rc. As described above, the document sheet is placed on the document tray 15 so that the long side of the document sheet is along the left and right direction of the image scanning apparatus 1. Additionally, the document sheet is fed along the document feeding path R extending along the left and right direction of the image scanning apparatus 1. Accordingly, the document sheet is fed along the document feeding path R in a state where the short side of the document sheet is along the front and rear direction of the image scanning apparatus 1.

Figure 4A:
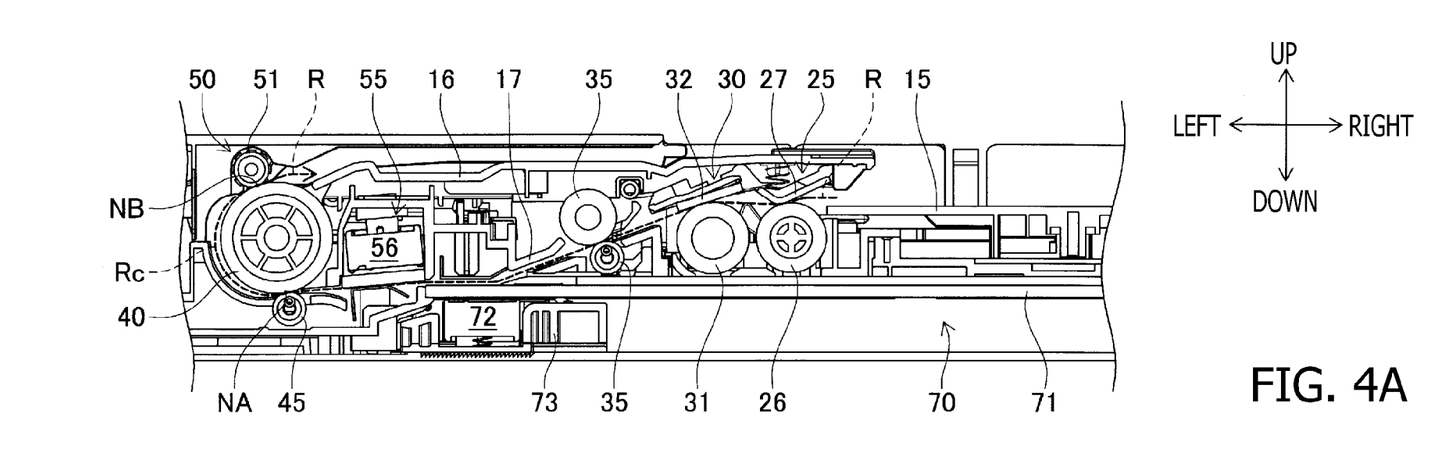
FIGS. 4A and 4B are schematic diagrams showing a relationship between a feeding path and a path length of the image scanning apparatus.
Figure 4B:
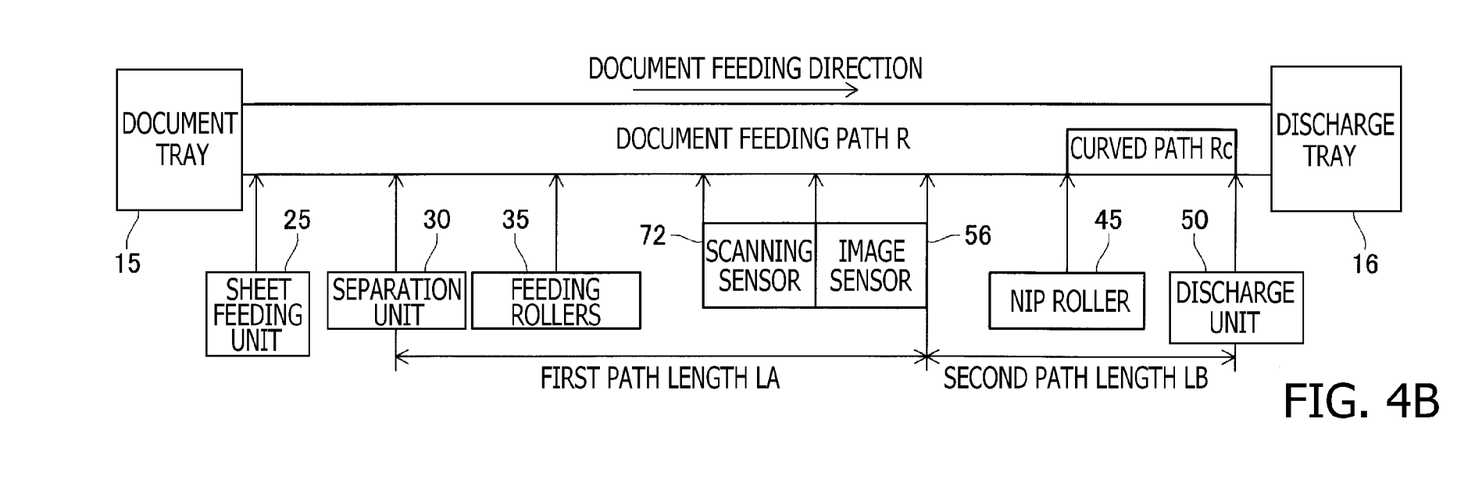

As shown in FIGS. 1 and 4, at a left side portion of the feeding path defining member 17 in the ADF unit 10, the curved path Rc is formed substantially in a "U" shape when viewed along the front and rear direction of the image scanning apparatus 1. The curved path Rc is configured to turn a feeding direction of the document sheet fed leftward from the document tray 15 by 180 degrees and guide the document sheet onto the surface of the discharge tray 16. Thus, the curved path Rc is disposed on the leftmost side of the document feeding path R in the document cover 5.

In the embodiment, the feeding direction of the document sheet is defined as a course on which the document sheet is fed from the surface of the document tray 15 to the discharge tray 16 along the document feeding path R. In addition, in the embodiment, the curved path Rc indicates a part between a nipping position of the main roller 40 and the nip roller 45 (hereinafter, referred to as "a first nipping position NA") and a nipping position of the main roller 40 and a discharge roller 51 (hereinafter, referred to as "a second nipping position NB").

The feeding mechanism 20 of the ADF unit 10 is configured to feed the document sheet placed on the document tray 15 toward a downstream side in the feeding direction along the document feeding path R, by a driving force transmitted from the driving motor (not shown).

The feeding mechanism 20 includes the sheet feeding unit 25, the separation unit 30, the feeding rollers 35, the main roller 40, the nip roller 45 and the discharge unit 50. As shown in FIG. 2, the sheet feeding unit 25 includes a pickup roller 26 and a document contact member 27. The sheet feeding unit 25 is configured to pick up the document sheets placed on the document tray 15 and feed them to the document feeding path R. The pickup roller 26 is rotatably supported to be along a downward-facing side of the document sheet being fed on the document feeding path R, at a downstream side of the document tray 15 in the feeding direction. When driven by the driving motor (not shown), the pickup roller 26 is rotated to feed the document sheets placed on the document tray 15 toward the downstream in the feeding direction.

The document contact member 27 is swingably provided in such a position as to face the pickup roller 26 across the document feeding path R and contact an upward-facing side of the document sheet lying on the pickup roller 26. The document contact member 27 is configured to press the document sheet placed on the document tray 15 against the pickup roller 26. Further, the document contact member 27 has a function to manage the document sheet to be smoothly separated from other sheets.

The separation unit 30 is configured to separate the document sheet picked up by the sheet feeding unit 25 from other sheets on a sheet-by-sheet basis and feed them downstream in the feeding direction. The separation unit 30 includes a separation roller 31, a separation pad 32, the first torsion spring 33, and a first reinforcing member 34.

The separation roller 31 is rotatably supported to be along the downward-facing side of the document sheet being fed on the document feeding path R, at a downstream side relative to the pickup roller 26 in the feeding direction. When driven by the driving motor, the separation roller 31 is rotated to separate a single document sheet from other sheets in association with the separation pad 32 and feed the separated toward the document sheet downstream in the feeding direction.

The separation pad 32 is a thin plate member made of material having a predetermined level of flexibility and a predetermined degree of frictional resistance. The separation pad 32 is disposed in such a position as to face the separation roller 31 across the document feeding path R at a downstream side relative to the document contact member 27 in the feeding direction. The separation pad 32 is disposed to contact an upward-facing side of a document sheet lying on the separation roller 31. The separation pad 32 is configured to apply a frictional force to the document sheet and separate the document sheet from other sheets on a sheet-by-sheet basis in association with the separation roller 31.

The first torsion spring 33 is a torsion coil spring configured to apply urging force generated from a torque around a coil shaft. The first torsion spring 33 includes an urging end portion 33A, a coil part 33B, and a fixed end portion 33C. The first torsion spring 33 is configured to urge the separation pad 32 toward the separation roller 31 at the lower face side of the discharge tray 16.

The urging end portion 33A is located at one end of the first torsion spring 33. When the urging end portion 33A contacts the upper face of the separation pad 32 (i.e., a reverse side of a face that faces the separation roller 31), the urging force of the first torsion spring 33 is applied to the separation pad 32.

The coil part 33B is formed in a coil shape by winding a wire extending from the urging end portion 33A. The torque is generated around the coil shaft of the coil part 33B. The coil part 33B is attached to the first spring attaching part 16A formed on the lower face of the discharge tray 16. As shown in FIG. 2, the first spring attaching part 16A is disposed on a downstream side relative to the separation roller 31 and the separation pad 32 and an upstream side relative to the feeding rollers 35 in the feeding direction. Thus, the coil part 33B is not located immediately above the separation pad 32 (i.e., the coil part 33B is displaced from a position immediately above the separation pad 32).

The fixed end portion 33C is a wire extending from the coil part 33B, and is located at another end of the first torsion spring 33 (i.e., an end opposite to the urging end portion 33A). The fixed end portion 33C is fixed on a predetermined position by the first fixed end portion supporting part 16B formed on the lower face of the discharge tray 16. As shown in FIG. 2, the first fixed end portion supporting part 16B is a plate extending in a horizontal direction (i.e., the left and right direction) and is disposed on a downstream side of the feeding rollers 35 in the feeding direction. The fixed end portion 33C is fixed on the upper face of the first fixed end portion supporting part 16B, and therefore, it is not located immediately above the separation pad 32 (i.e., the fixed end portion 33C is displaced from a position immediately above the separation pad 32).

As shown in FIG. 2, the first reinforcing member 34 is formed by bending a metal plate and attached to the first spring attaching part 16A. Accordingly, the strength of the first spring attaching part 16A is improved by the first reinforcing member 34.

As shown in FIG. 2, the urging end portion 33A of the first torsion spring 33 is located at a position immediately above the separation pad 32 but the coil part 33B and the fixed end portion 33C are not located immediately above the separation pad 32 Therefore, according to the image scanning apparatus 1 in the embodiment, downsizing of the apparatus in the up and down direction is achieved when compared to a case where the separation pad 32 is urged by a coil spring located immediately above the separation pad 32.

The feeding rollers 35 are rotatably supported in such respective positions as to face each other across the document feeding path R at a downstream side relative to the separation unit 30 in the feeding direction. One of the feeding rollers 35 disposed on an upper portion of the document feeding path R is driven to rotate by the driving force from the driving motor (not shown). The other of the feeding rollers 35 disposed on a lower portion of the document feeding path R is driven by rotation of the opposed roller 35. The feeding rollers 35 are configured to feed the document sheet separated by the separation roller 31 from other sheets on a sheet-by-sheet basis downstream in the feeding direction along the document feeding path R by rotating while pinching the separated document sheet therebetween.

When the scanning sensor 72 and the carriage 73 are located at the ADF scanning position, they are located at the downstream side of the feeding rollers 35 in the feeding direction and at the lower side of the document feeding path R (see FIG. 1). Then, an image on a first face of the document sheet that is fed along the document feeding path R is scanned by the scanning sensor 72. The image scanning unit 55 of the ADF unit 10 is disposed side-by-side with the scanning sensor 72 in the carriage 73 located at the ADF scanning position at the downstream side in the feeding direction. And the image scanning unit 55 is disposed on an opposite side of the scanning sensor 72 in the carriage 73 across the document feeding path R (see FIG. 1), so that an image on a second face of the document sheet that is fed along the document feeding path R is scanned by the image scanning unit 55.

Figure 6:
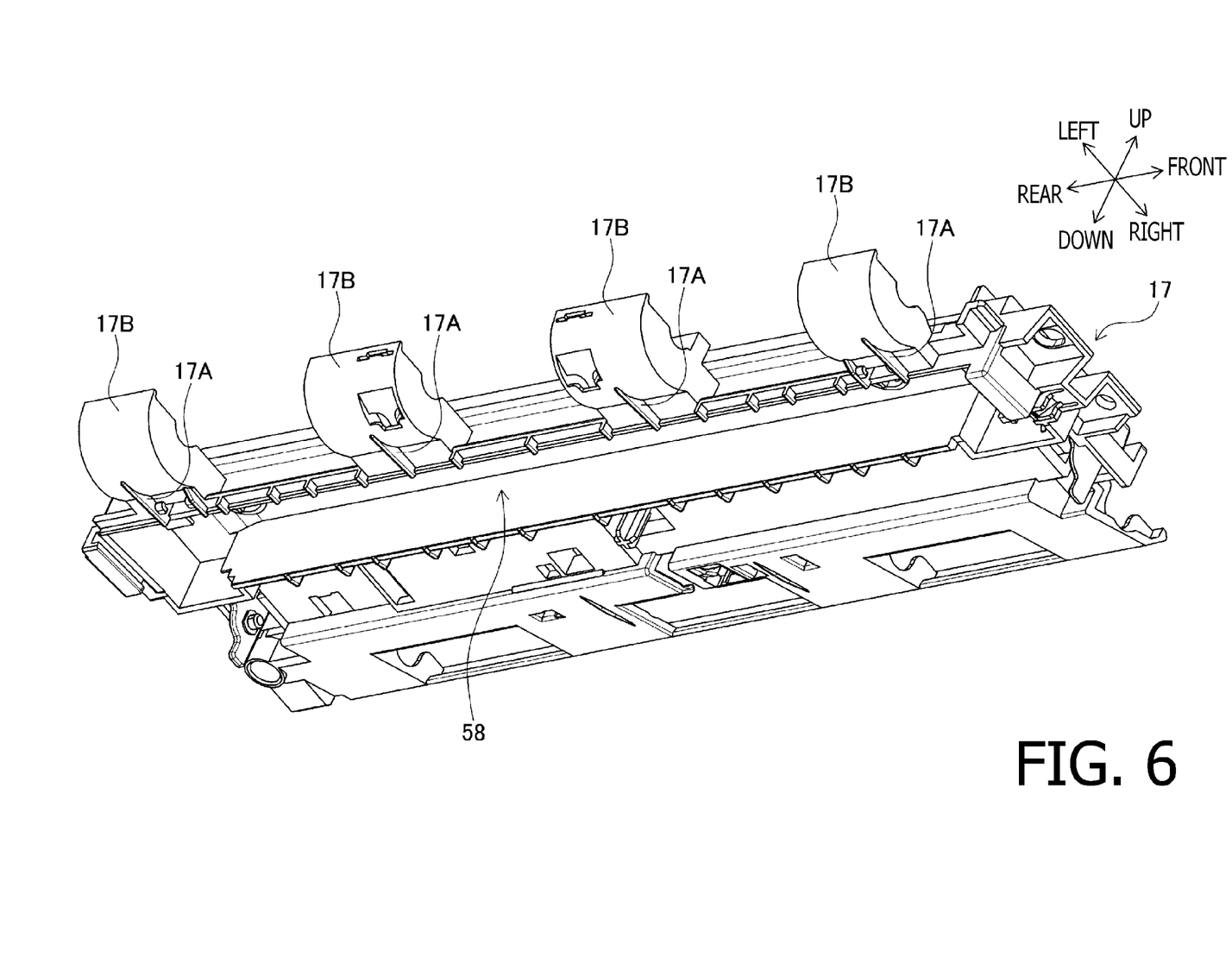
FIG. 6 is a perspective view showing configurations of a feeding path defining member.

The main roller 40 is rotatably supported in the main roller supporting part 17B formed on the left side of the feeding path defining member 17 (see FIG. 6). The main roller 40 is driven to rotate by the driving motor (not shown). The main roller 40 is located at a downstream side relative to the scanning sensor 72 and the image scanning unit 55 in the feeding direction. An outer circumference surface of the main roller 40 is along the curved path Rc that forms a part of the document feeding path R. That is, the outer circumference surface of the main roller 40 forms a part of the curved path Rc. In response to rotation of the main roller 10, the document sheet fed by the feeding rollers 45 is conveyed along the curved path Rc.

Figure 3:
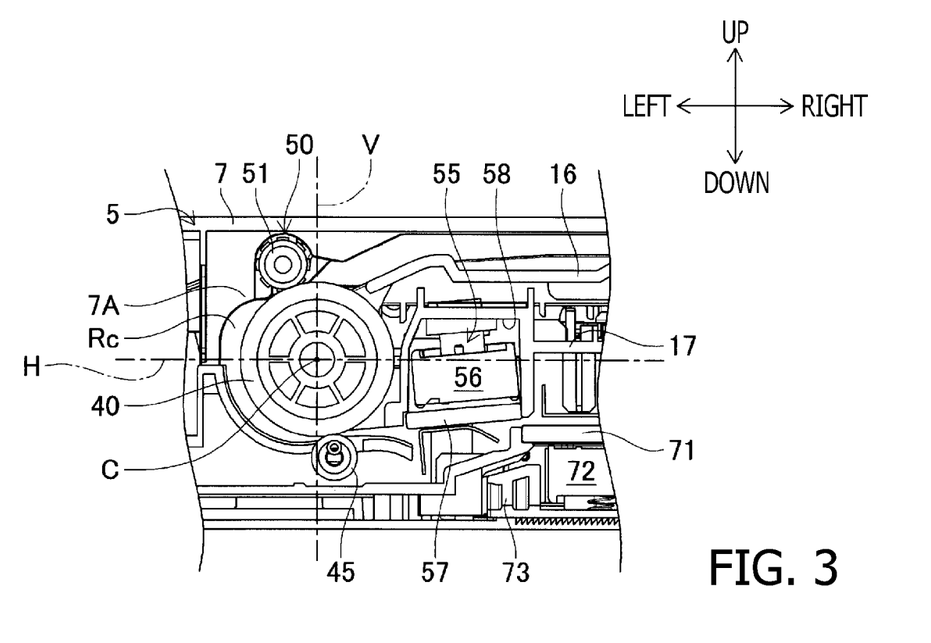
FIG. 3 is an enlarged cross-sectional view showing configurations around a main roller.

Hereinafter, as shown in FIG. 3, a center of the main roller 40 is referred to as "rotating center C," an auxiliary line extending in a vertical direction (i.e., up and down direction of the image scanning apparatus 1) through the rotating center C is referred to as "a vertical auxiliary line V," and an auxiliary line extending in a horizontal direction (i.e., left and right direction of the image scanning apparatus 1) through the rotating center C is referred to as "a horizontal auxiliary line H."

The nip roller 45 is rotatably supported in such a position as to face the main roller 40 across the document feeding path R at the lower side of the main roller 40. The nip roller 45 is driven by rotation of the main roller 40. As shown in FIG. 3, the nip roller 45, which contacts with the main roller 40, is disposed so that a rotating center of the nip roller 45 is shifted to the upstream side in the feeding direction from a position that is immediately below the rotating center C in the vertical direction. That is, the rotating center of the nip roller 45 is not located on the vertical auxiliary line V in FIG. 3. Therefore, according to the image scanning apparatus 1 in the embodiment, the height of the image scanning apparatus 1 in the up and down direction can be reduced when compared to a case where the rotating center of the nip roller 45 is located immediately below the rotating center C (i.e., located on the vertical auxiliary line V).

The discharge unit 50 is configured to discharge the document sheet fed along the curved path Rc to the discharge tray 16. The discharge unit 50 includes the discharge roller 51, a second torsion spring 52, and a second reinforcing member 53.

The discharge roller 51 is rotatably supported in such a position as to face the main roller 40 across the document feeding path R at the upper side of the main roller 40. The discharge roller 51 is driven by rotation of the main roller 40. As shown in FIG. 3, the discharge roller 51, which contacts with the main roller 40, is disposed so that a rotating center of the discharge roller 51 is shifted to the upstream side in the feeding direction from a position that is immediately above the rotating center C in the vertical direction. That is, the rotating center of the discharge roller 51 is not located on the vertical auxiliary line V. Further, the discharge roller 51 is disposed so that the rotating center thereof is located at the downstream side relative to the horizontal auxiliary line H. Therefore, according to the image scanning apparatus 1 in the embodiment, the height of the image scanning apparatus 1 can be reduced when compared to a case where the rotating center of the discharge roller 51 is located at a position immediately above the rotating center C (i.e., located on the vertical auxiliary line V).

The second torsion spring 52 is a torsion coil spring configured to apply urging force generated by a torque around a coil shaft, similarly to the first torsion spring 33. The second torsion spring 52 is configured to apply the urging force to the rotating shaft of the discharge roller 51 to urge the discharge roller 51 toward the outer circumference surface of the main roller 40. According to this, the document sheet fed along the curved path Rc can be nipped steadily by the discharge roller 51 and the main roller 40. Thus, the document sheet can be discharged to the discharge tray 16 properly. The configuration and installation of the second torsion spring 52 and the second reinforcing member 53 will be described in detail later with reference to the relevant drawings.

As shown in FIGS. 1 and 3, the image scanning unit 55 is disposed along the upper side of the document feeding path R, at the downstream side of the feeding rollers 35, and the upstream side of the main roller 40 and the nip roller 45 in the feeding direction. As shown in FIG. 3, the image scanning unit 55 includes an image sensor 56, a glass member 57, and the sensor housing 58 formed on the feeding path defining member 17. The image scanning unit 55 is configured to scan an image on the second face of the document sheet fed along the document feeding path R.

As shown in FIGS. 1, 3, 4 and 6, the sensor housing 58 is formed on the lower face of the feeding path defining member 17. The sensor housing 58 accommodates the image sensor 56 therein. The sensor housing 58 is formed in a downward-recessed shape located to face the document feeding path R. A long side of the sensor housing 58 is along the front and rear direction of the image scanning apparatus 1, and slightly longer than the short side of the A4 size.

The image sensor 56 is provided with a contact image sensor (CIS) similarly to the scanning sensor 72, and configured to scan an image of the document sheet fed along the document feeding path R at the lower side of the sensor housing 58. The image sensor 56 has a scanning face having an imaging device on one side. The length of the main scanning direction (i.e., the front and rear direction of the main housing 60) of the image sensor 56 corresponds to the length of the short side of A4 size. As shown in FIGS. 1 and 3, the image sensor 56 is accommodated in the sensor housing 58 so that the scanning face of the image sensor 56 faces the document feeding path R. The glass member 57 is a so-called "platen glass" similarly to the contact glass 71. The glass member 57 covers the opening of the sensor housing 58 to seal the sensor housing 58.

Subsequently, the configuration and the path length of the document feeding path R of the image scanning apparatus 1 according to the embodiment is described in detail with reference to FIGS. 4A and 4B. As shown in FIG. 4A, the document feeding path R connects the document tray 15 with the discharge tray 16. On the document feeding path R, the sheet feeding unit 25, the separation unit 30, the feeding rollers 35, the scanning sensor 72, the image sensor 56, the main roller 40, the nip roller 45, and the discharge unit 50 are disposed.

As shown in FIG. 4B, a first path length LA indicates a length of the document feeding path R from the separation unit 30 to a downstream side end of the image sensor 56 in the feeding direction. That is, the first path length LA includes a part of the document feeding path R on which the scanning sensor 72 and the image sensor 56 at the ADF scanning position are disposed. Thus, when the both side scanning is performed, the first path length LA depends on a length of the part of the document feeding path R on which the scanning sensor 72 and the image sensor 56 are disposed. Specifically, the first path length LA may not be shortened than the length of the part of the document feeding path R on which the scanning sensor 72 and the image sensor 56 are disposed.

On the other hand, a second path length LB indicates a length of the document feeding path R from the downstream side end of the image sensor 56 in the feeding direction to the discharge unit 50. Since the nip roller 45 and the discharge unit 50 are disposed in the downstream side part of the image sensor 56 in the feeding direction as described above, the second path length LB includes the first nipping position NA and the second nipping position NB. Then, the curved path Rc is the path between the first nipping position NA and the second nipping position NB. That is, the second path length LB includes the curved path Rc. Therefore, the second path length LB may be shortened to substantially the same length as the curved path Rc. As can be seen from FIGS. 4A and 4B, the second path length LB is defined to be shorter than the first path length LA. Thus, the length of the entire document feeding path R can be shortened. Therefore, according to the image scanning apparatus 1 in the embodiment, a required time for performing the both side scanning for a single document sheet (i.e., a period of time starting from the separation of the sheets by the separation unit 30 to the discharge by the discharge unit 50 via the both side scanning) can be shortened.

Subsequently, the configuration of the upper cover 7 that forms the upper face of the ADF unit 10 of the image scanning apparatus 1 according to the embodiment is described in detail with reference to FIG. 5. As described above, the upper cover 7 is a cover member that forms the upper face of the ADF unit 10. The upper cover 7 is provided to be openable and closeable relative to the cover housing 6 that forms the outer body of the ADF unit 10. When the upper cover 7 is opened, a part of the document feeding path R is exposed. Thus, when the document sheet is jammed, it can be removed by opening the upper cover 7. Further, the upper cover 7 is provided with the second guide rib 7A, the second spring attaching part 7B and the second fixed end portion supporting part 7C.

The second guide rib 7A is a rib perpendicularly protruded on a planar section of the lower face of the upper cover 7. A plurality of second guide ribs 7A is disposed with a predetermined distance from each other in the front and rear direction. Each of the second guide rib 7A extends from the planer section of the lower face of the upper cover 7 to the down side in the vertical direction at a state where the upper cover 7 is closed with respect to the cover housing 6. The edge of the second guide rib 7A is formed in an arched shape when viewed along the front and rear direction of the image scanning apparatus 1. The edge of the second guide rib 7A is disposed on the left side relative to the outer circumference surface of the main roller 40 when the upper cover 7 is closed with respect to the cover housing 6 (see FIG. 8). That is, the edge of the second guide rib 7A forms a part of the curved path Rc at a side that faces the outer circumference surface of the main roller 40.

The second spring attaching part 7B is formed on the planer section of the lower face of the upper cover 7 at the left side relative to the second guide rib 7A. The second torsion spring 52 included in the discharge unit 50 is attached to the second spring attaching part 7B. In addition, the second reinforcing member 53 is attached to the second spring attaching part 7B.

The second fixed end portion supporting part 7C is formed at the left side relative to the second spring attaching part 7B and configured to support the fixed end portion 52C of the second torsion spring 52. The second fixed end portion supporting part 7C is formed as a plate member extending in the horizontal direction (i.e., left and right direction). The second fixed end portion supporting part 7C is disposed below the planner section of the upper cover 7 with a predetermined distance from the planner section of the upper cover 7. The fixed end portion 52C of the second torsion spring 52 is fixed on an upper face of the second fixed end portion supporting part 7C.

Subsequently, the configuration of the feeding path defining member 17 disposed in the ADF unit 10 according to the embodiment is described in detail with reference to FIG. 6. As described above, the lower face of the feeding path defining member 17 forms the part extending in the left and right direction under the ADF unit 10 in the document feeding path R. The feeding path defining member 17 is provided with the first guide rib 17A, the main roller supporting part 17B and the sensor housing 58.

As described above, the sensor housing 58 is formed on the lower face of the feeding path defining member 17 in the downward-recessed shape located to face the document feeding path R. The long side of the sensor housing 58 is along the front and rear direction of the image scanning apparatus 1, and slightly longer than the short side of the A4 size (see FIG. 6). The sensor housing 58 accommodates the image sensor 56 of the image scanning unit 55 therein. Further, the opening of the sensor housing 58 is sealed with the glass member 57.

As shown in FIG. 6, a plurality of main roller supporting parts 17B (e.g., four of main roller supporting parts 17B are provided in the embodiment) is formed at the left side of the feeding path defining member 17 with a predetermined distance from each other in the front and rear direction. The main roller supporting part 17B is formed in a semicircular shape when viewed along the front and rear direction of the image scanning apparatus 1 and configured to support the rotating shaft of the main roller 40 in its center. The contact face of the main roller 40 (i.e., a part to be contacted with the document sheet) is located between two of the main roller supporting parts 17B. The feeding path defining member 17 is formed so that the radius of the semicircular part of the main roller supporting part 17B is smaller than the radius of the main roller 40. Thus, when the main roller 40 is supported by the main roller supporting part 17B, the contact face of the main roller 40 may contact the document sheet fed along the document feeding path R (including the curved path Rc).

As shown in FIG. 6, the first guide rib 17A is protruded downward from the feeding path defining member 17 between the edge of the opening of the sensor housing 58 and the main roller supporting part 17B, extending in the left and right direction. The lower edge of the first guide rib 17A smoothly connects the edge of the opening of the sensor housing 58 with the lowermost end of the main roller supporting part 17B.

Subsequently, the configuration of the second torsion spring 52 included in the discharge unit 50 is described in detail with reference to relevant drawings. The second torsion spring 52 includes an urging end portion 52A, a coil part 52B and a fixed end portion 52C, and is configured to apply the urging force generated by the torque around the coil shaft. The second torsion spring 52 is configured to urge the discharge roller 51 toward the outer circumference surface of the main roller 40 via the rotating shaft of the discharge roller 51.

Figure 7:
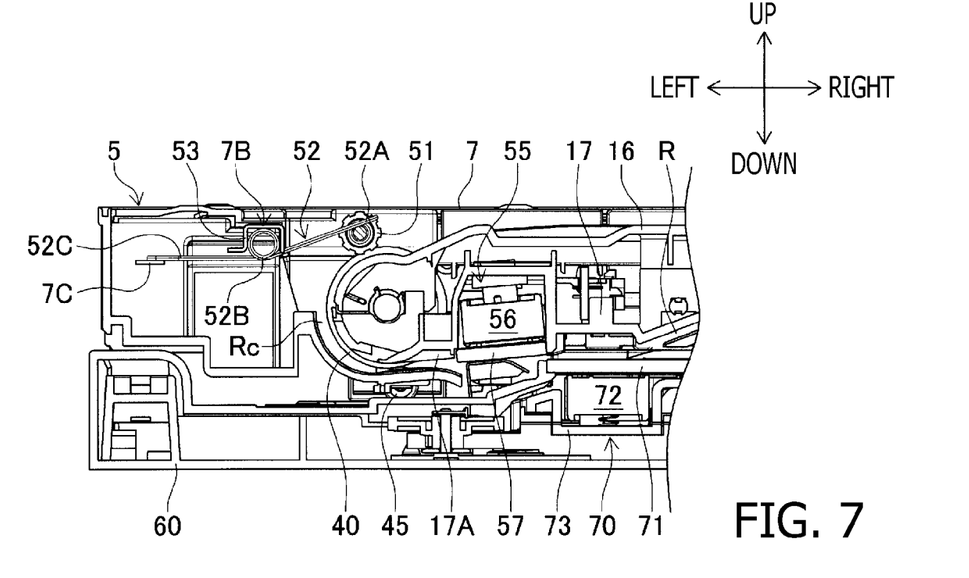
FIG. 7 is an enlarged cross-sectional view showing configurations of a discharge unit.

As shown in FIGS. 5 and 7, the urging end portion 52A is located at one end of the second torsion spring 52 and configured to contact the upper side of the rotating shaft of the discharge roller 51 to apply the urging force thereto.

The coil part 52B is formed in a coil shape by winding a wire extending from the urging end portion 52A. The torque is generated around the coil shaft of the coil part 52B. The coil part 52B is attached to the second spring attaching part 7B formed on the upper cover 7. As shown in FIGS. 5 and 7, the second spring attaching part 7B is disposed on the left side relative to the discharge roller 51. Thus, the coil part 52B is not disposed immediately above the discharge roller 51 (i.e., the coil part 52B is displaced from a position immediately above the discharge roller 51).

The fixed end portion 52C is a wire extending from the coil part 52B and located at another end of the second torsion spring 52 (i.e., an end opposite to the urging end portion 52A). The fixed end portion 52C is fixed on the second fixed end portion supporting part 7C formed on the upper cover 7. As described above, since the second fixed end portion supporting part 7C is disposed on the left side relative to the second spring attaching part 7B, the fixed end portion 52C is not placed immediately above the discharge roller 51 (i.e., the fixed end portion 52C is displaced from the position immediately above the discharge roller 51). As shown in FIGS. 5 and 7, the second reinforcing member 53 is formed by bending a metal plate and attached to the second spring attaching part 7B. Accordingly, the strength of the second spring attaching part 7B is improved by the second reinforcing member 53.

As shown in FIG. 7, the urging end portion 52A of the image scanning unit 55 is located immediately above the discharge roller 51 but the coil part 52B and the fixed end portion 52C are not located immediately above the discharge roller 51. Therefore, according to the image scanning apparatus 1 in the embodiment, the height of the apparatus in the up and down direction can be reduced when compared to a case where the second torsion spring 52 is urged by a coil spring located immediately above the discharge roller 51.

Subsequently, the behaviors of the first guide rib 17A and the second guide rib 7A are described in detail with reference to FIG. 8. As described above, the first guide rib 17A is protruded downward from the planer section of the lower face of the feeding path defining member 17, and to extend between the edge of the opening of the sensor housing 58 and the main roller supporting part 17B in the left and right direction.

The document sheet is fed along the document feeding path R while contacting with the surface of the glass member 57 disposed on the opening of the sensor housing 58 in the image scanning unit 55. Thus, after the document sheet passes through the image scanning unit 55, the document sheet is fed toward the downstream in the feeding direction (i.e., toward the main roller 40) along the document feeding path R while contacting with the lower edge of the first guide rib 17A.

Figure 8:
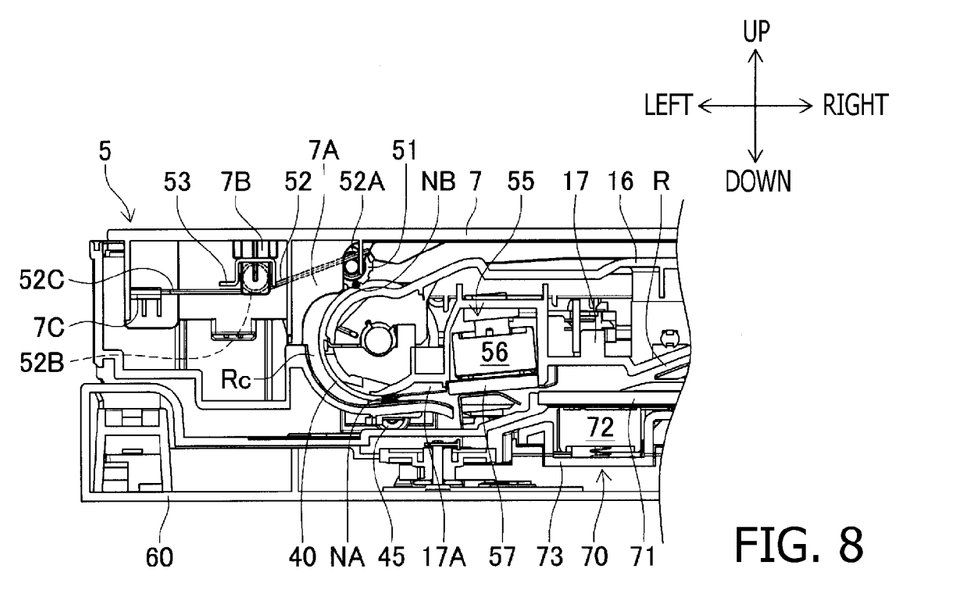
FIG. 8 is a schematic diagram showing behaviors of a first guide rib and a second guide rib.

As shown in FIGS. 6 through 8, the lower edge of the first guide rib 17A smoothly connects the edge of the opening of the sensor housing 58 with the lowermost part of the main roller supporting part 17B. Thus, the document sheet is fed along the lower edge of the first guide rib 17A and guided to the first nipping position NA. Then, the document sheet is steadily nipped and fed by the main roller 40 and the nip roller 45. That is, according to the image scanning apparatus 1 in the embodiment, the document sheet of which image has been scanned by the image scanning unit 55 could be suitably guided to the first nipping position NA by the first guide rib 17A, and therefore, the document sheet can be fed properly by the main roller 40 and the nip roller 45.

Further, as described above, the document sheet is fed to the downstream side in the feeding direction while contacting the edge of the second guide rib 7A when it is fed from the first nipping position NA to the downstream side in the feeding direction. As shown in FIG. 8, the second guide rib 7A extends around the outer circumference surface of the main roller 40 at the upstream side relative to the second nipping position NB in the feeding direction. That is, the edge of the second guide rib 7A also extends around the outer circumference surface of the main roller 40 at the upstream side relative to the second nipping position NB in the feeding direction. Thus, the document sheet is guided to the second nipping position NB by the edge of the second guide rib 7A and discharged by the main roller 40 and the discharge roller 51. That is, according to the image scanning apparatus 1 in the embodiment, the document sheet fed along the curved path Rc can be suitably guided to the second nipping position NB by the second guide rib 7A, and therefore, the document sheet can be discharged properly to the discharge tray 16 by the main roller 40 and the discharge roller 51.

As explained above, in the image scanning apparatus 1 according to the embodiment, the ADF unit 10 is configured to scan images on the both face of the document sheet while feeding the document sheet placed on the document tray 15 along the document feeding path R, and discharge the document sheet to the discharge tray 16. In the image scanning apparatus 1, the image scanning unit 55 and the scanning sensor 72 in the carriage 73 are disposed side-by-side in the feeding direction and at opposite sides with respect to the feeding path R. Thus, according to the image scanning apparatus 1 in the embodiment, a size of the apparatus can be reduced in addition to perform the both side scanning by disposing the image sensor 56 and the scanning sensor 72 in such a manner.

Additionally, the image scanning apparatus 1 is configured so that the first path length LA is shorter that the second path length LB (see FIGS. 4A and 4B). Since the first path length LA includes a path on which the scanning sensor 72 and the image sensor 56 are disposed, the first path length LA is required to have a predetermined length in order to perform the both side scanning. Therefore, by defining the second path length LB to be short, the path length of the entire document feeding path R can be shortened. Thus, according to the image scanning apparatus 1, a required time for performing the both side scanning for a single document sheet can be shortened.

Further, in the image scanning apparatus 1 according to the embodiment, a part of the curved path Rc is formed by the outer circumference surface of the main roller 40. Therefore, the size of the image scanning apparatus 1 can be reduced when compared to a case where the curved path Rc is formed by resin members, and a plurality of rollers are provided to feed the document sheet. Additionally, in the image scanning apparatus 1, the image sensor 56 and the scanning sensor 72 are respectively disposed to be shifted in the left and right direction with respect to the rotating center of the main roller 40. Therefore, the image sensor 56 and the scanning sensor 72 may not overlap with the main roller 40 in the vertical direction. Thus, according to the image scanning apparatus 1 in the embodiment, a size of the apparatus in the up and down direction can be reduced by disposing the image sensor 56 and the scanning sensor 72 in such a manner. Additionally, in the image scanning apparatus 1, the nip roller 45 and the discharge roller 51 are respectively disposed to be shifted in the left and right direction with respect to the rotating center of the main roller 40. Therefore, rotating centers of the nip roller 45 and the discharge roller 51 may not overlap with the rotating center of the main roller 40 in the vertical direction. Thus, according to the image scanning apparatus 1 in the embodiment, a size of the apparatus in the up and down direction can be reduced by disposing the nip roller 45 and the discharge roller 51 in such a manner.

Only an exemplary embodiment of the disclosure and a few examples of their versatility are shown and described in the disclosure. It is to be understood that the disclosure is capable of use in various other combinations and environments and is capable of changes or modifications within the scope of the inventive concept as expressed herein. For example, in the above embodiment, an image scanning apparatus configured to scan an image of the document sheet is described but it is not limited thereto. Specifically, the image scanning apparatus may be a copying device having a printing function in addition to the scanning function, or a multifunction device having various functions such as a printing function and a facsimile function in addition to the scanning function.

What is claimed is:

1. An image scanning apparatus comprising:
a feeding unit configured to feed at least one document sheet in a feeding direction along a feeding path, the feeding path includes a curved path formed to change the feeding direction with respect to the image scanning apparatus; and
a scanning unit configured to scan an image of the document sheet fed by the feeding unit along the feeding path; and wherein the feeding unit comprises:
a main roller configured to be rotated to feed the document sheet along the curved path, a circumference surface of the main roller forming a part of the curved path;
a separation unit configured to separate the document sheet from other sheets on a sheet-by-sheet basis and convey the separated sheet to the scanning unit; and
a discharge unit configured to discharge the document sheet to a discharge tray, the discharge unit being disposed on an upstream side relative to the discharge tray and on a downstream side relative to the scanning unit in the feeding direction,
wherein a length of the feeding path from a downstream side end of the scanning unit in the feeding direction to a position of the discharge unit is shorter than a length of the feeding path from a position of the separation unit to the downstream side end of the scanning unit,
wherein the curved path is disposed only on the downstream side of the scanning unit in the feeding direction,
wherein the scanning unit comprises:
a first image sensor configured to scan an image on a first face of the document sheet; and
a second image sensor configured to scan an image on a second face of the document sheet that is opposite to the first face, the second image sensor and the first image sensor being disposed side-by-side in the feeding direction and on opposite sides of the feeding path, and
wherein one of the first image sensor and the second image sensor is disposed to overlap the main roller when viewed from a direction in which the document sheet is conveyed over the first and second image sensors.

2. The image scanning apparatus according to claim 1, wherein the scanning unit is disposed on an upstream side relative to the main roller in the feeding direction.

3. The image scanning apparatus according to claim 2, wherein the discharge unit comprises a discharge roller configured to nip the document sheet with the circumference surface of the main roller and to be rotated to discharge the document sheet fed along the curved path to the discharge tray, and
wherein the discharge roller is disposed on a downstream side of the curved path in the feeding direction so that a rotating center of the discharge roller is located at an upstream side relative to a vertical line that passes through a rotating center of the main roller in the feeding direction.

4. The image scanning apparatus according to claim 3, wherein the feeding unit further comprises a second guide rib disposed on an upstream side relative to the discharge roller in the feeding direction, and
wherein the second guide rib is protruded toward the circumference surface of the main roller across the curved path.

5. The image scanning apparatus according to claim 4, wherein the second guide rib is configured to guide the document sheet so that the document sheet is fed along the circumference surface of the main roller at an upstream side relative to a nipping position between the discharge roller and the main roller.

6. The image scanning apparatus according to claim 3, wherein the discharge unit further comprises a second urging member configured to urge a rotating shaft of the discharge roller toward the main roller, wherein the second urging member comprises:
- a first end portion configured to contact the rotating shaft of the discharge roller to urge the discharge roller toward the main roller;
- a second end portion fixed to a frame member that defines the curved path, the second end portion being disposed opposite to the first end portion; and
- an intermediate part located between the first end portion and the second end portion.

7. The image scanning apparatus according to claim 6, wherein
the second urging member is a torsion spring, and
the intermediate part has a coil shape and is fixed to a second attaching part formed on the frame member.

8. The image scanning apparatus according to claim 6, wherein the discharge unit further comprises a second reinforcing member attached to the second attaching part.

9. The image scanning apparatus according to claim 2, wherein the feeding unit further comprises:
- a nip roller configured to nip the document sheet with the main roller and to be rotated to feed the document sheet along the feeding path at the downstream side relative to the scanning unit in the feeding direction; and
- a first guide rib protruded toward the curved path at an upstream side relative to the nip roller in the feeding direction.

10. The image scanning apparatus according to claim 9, wherein the first guide rib is configured to contact the document sheet on the upstream side relative to the nip roller to guide the document sheet toward a nipping position between the main roller and the nip roller.

11. The image scanning apparatus according to claim 1, wherein the separation unit comprises:
- a separation roller configured to contact the document sheet and to be rotated to separate the document sheet from the other sheets;
- a separation pad configured to separate the document sheet from the other sheets in association with the separation roller;
- a first urging member configured to urge the separation pad toward the separation roller, wherein the first urging member comprises:
  - a first end portion configured to contact the separation pad to urge the separation pad toward the separation roller;
  - a second end portion fixed to a frame member, the second end portion being disposed opposite to the first end portion; and
  - an intermediate part located between the first end portion and the second end portion.

12. The image scanning apparatus according to claim 11, wherein,
the first urging member is a torsion spring, and
the intermediate part has a coil shape and is fixed to a first attaching part formed on the frame member at a position shifted from a position of the separation pad.

13. The image scanning apparatus according to claim 11, wherein the separation unit further comprises a first reinforcing member attached to the first attaching part.

* * * * *